United States Patent [19]
Harrill

[11] 4,027,566
[45] June 7, 1977

[54] CIRCLE CUTTING ATTACHMENT FOR BAND SAW

[76] Inventor: Thomas D. Harrill, Rte. 1, Mabank, Tex. 75147

[22] Filed: May 13, 1976

[21] Appl. No.: 686,672

[52] U.S. Cl. ............................. 83/411 R; 83/733; 83/439; 83/802

[51] Int. Cl.² ...................................... B27B 13/04

[58] Field of Search ................ 83/411 R, 708, 733, 83/439, 802, 788

[56] References Cited
UNITED STATES PATENTS

| | | | |
|---|---|---|---|
| 596,738 | 1/1898 | Castle | 83/411 R |
| 2,720,897 | 10/1955 | Kairath | 83/439 |
| 2,766,784 | 10/1956 | Antczak | 83/439 |
| 2,801,652 | 8/1957 | Meeker | 83/439 |
| 2,898,955 | 8/1959 | Schwartz | 83/411 R |

*Primary Examiner*—Donald R. Schran

*Attorney, Agent, or Firm*—Clarence A. O'Brien; Harvey B. Jacobson

[57] ABSTRACT

A horizontal base including a plurality of side by side horizontally spaced apart parallel guides is provided and a follower is selectively removably engageable with any one of the guides for guided movement therealong. A workpiece support is rotatably supported from the follower for angular displacement about an upstanding axis substantially normal to the plane containing the guides and the base is stationarily positionable on the horizontal table of a band saw or jig saw and a workpiece to have a constant radius arcuate cut made therein may be supported from the workpiece support and angularly displaced therewith in order that the blade of the saw may make the desired arcuate cut. The spacing of the parallel guide with which the follower is guidingly engaged from the blade of the saw determines the radius of curvature of the arcuate cut to be made.

7 Claims, 4 Drawing Figures

CIRCLE CUTTING ATTACHMENT FOR BAND SAW

BACKGROUND OF THE INVENTION

Various forms of saw attachments and apparatus designed for use in conjunction with various types of saws have been heretofore provided to enable a saw to make a constant radius arcuate cut in a workpiece. However, these previously known attachments have for most part not been readily adaptable for use with band saws as well as jig saws and have been difficult to use and not readily adaptable to various different makes of saws.

Examples or previously patented circle cutting attachments or saws are disclosed in U.S. Pat. Nos. 2,157,310, 2,720,897, 2,766,784 and 2,801,652.

BRIEF DESCRIPTION OF THE INVENTION

The attachment of the instant invention includes a horizontal panel-like base adapted to be supported from the upper surface of the table portion of a band saw, and a jig saw. The base is of a plan area to project outwardly from at least two sides of the associated saw table and includes a telescopic support leg whereby the outwardly extending portion of the panel-like base may be adequately supported. Further, the base includes side by side parallel guides and a follower removably engageable with any one of the guides for guided movement therealong. The base is to be supported from the associated saw table with the guides generally paralleling the plane of the saw blade of the saw a workpiece support overlies the panel-like base and is rotatably supported from the follower, whereby a workpiece may be supported from the workpiece support and angularly displaced during advancement of the workpiece relative to the saw blade.

The main object of this invention is to provide an attachment whereby constant radius arcuate cuts may be made in a workpiece by an associated jig saw or band saw.

Another object of this invention is to provide an attachment of such construction so as to be readily adaptble for use in conjunction with jig saws and band saws of various manufacture.

Yet another object of this invention is to provide an attachment in accordance with the preceding objects and which will enable proper positioning of the attachment relative to the associated saw blade to make an arcuate cut in a workpiece with the cut having a constant radius of curvature of any dimension within the limits of the attachment.

Another important object of this invention is to provide an attachment which may be readily and quickly operatively associated with a selected band saw or jig saw.

A final object of this invention to be specifically enumerated herein is to provide an attachment in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
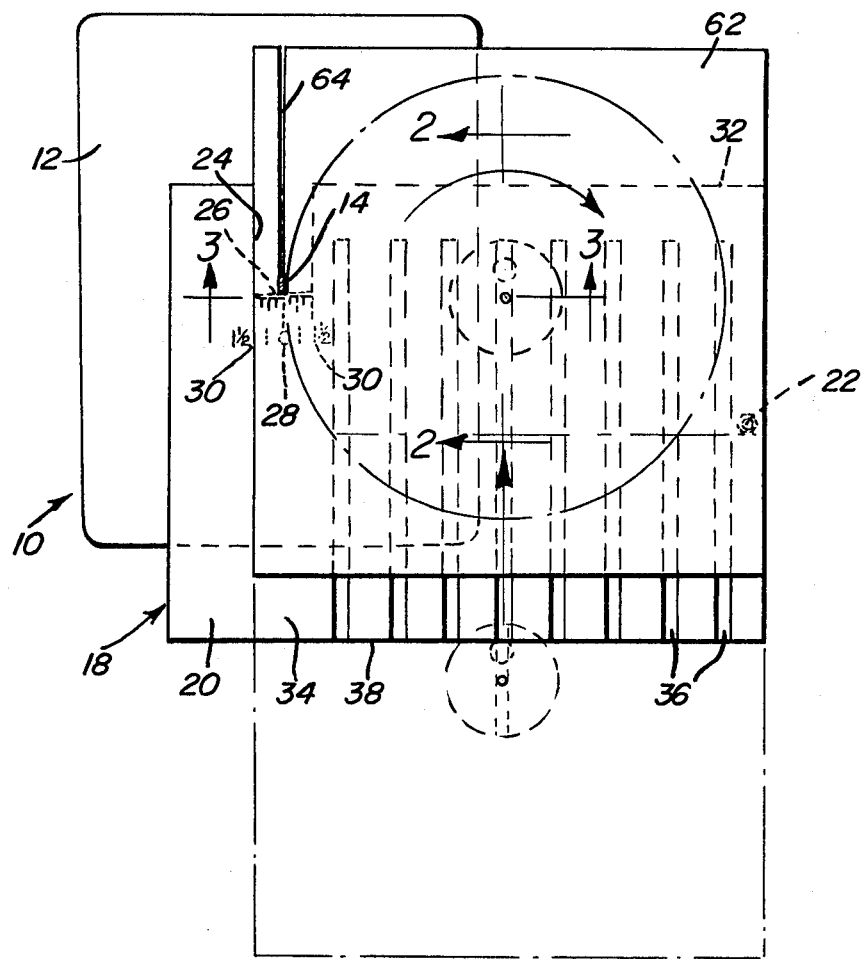
FIG. 1 is a top plan view of a band saw table having the circle cutting attachment of the instant invention operatively associated therewith and with a workpiece to have an arcuate cut made therein supported from the attachment, the blade of the saw being illustrated in horizontal section.

Referring now more specifically to the drawings, the numeral 10 generally designates a conventonal form of band saw including a table 12 and a driven band saw blade 14 which extends downwardly through a vertical central opening 16 formed in the table 12.

The circle cutting attachment of the instant invention is referred to in general by the reference numeral 18 and includes a horizontal panel-like base 20 of substantially rectangular configuration. One end of the base 20 includes a depending adjustable length vertical support leg assembly 22 spaced intermediate the opposite sides of the base 20 and one side marginal portion of the base 20 adjacent the remote end of the base includes a laterally outwardly opening vertical notch 24 formed therethrough. The notch 24 is 3 inches in width and the inner end 26 thereof is provided with a center 0 indicia 28 and relatively reversed inch scale indicia 30 on opposite sides of the center indicia 28. Further, while the longitudinal side edge 32 of the base 20 as the notch 24 formed therein, the upper surface 34 of the base 20 has inverted T-shaped slots 36 formed therein which open through the opposite longitudinal side edge 38 of the base 20. The slots or grooves 36 parallel each other and the notch 24.

Figure 2:
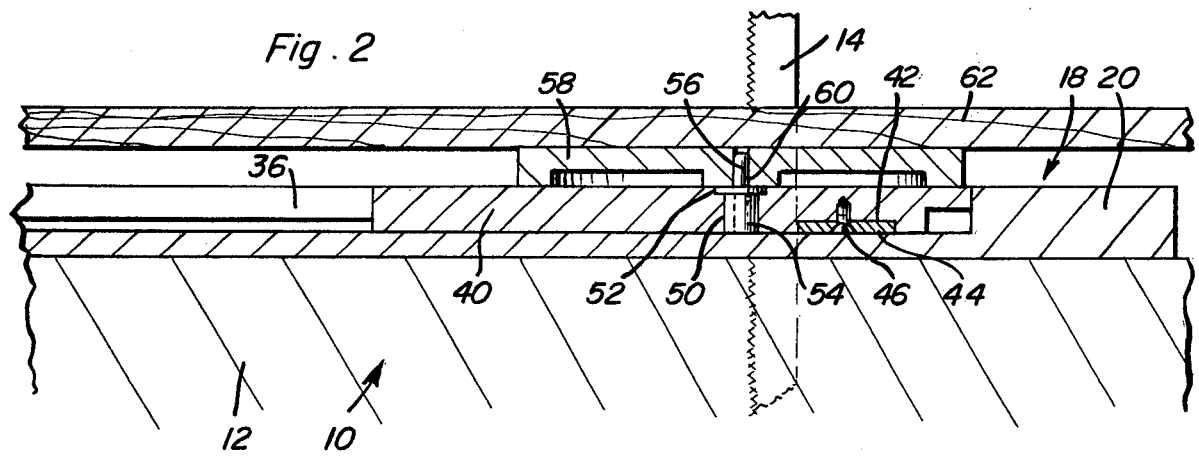
FIG. 2 is a fragmentary enlarged vertical sectional view taken substantially upon the plane indicated by the section line 2—2 of FIG. 1.
Figure 3:
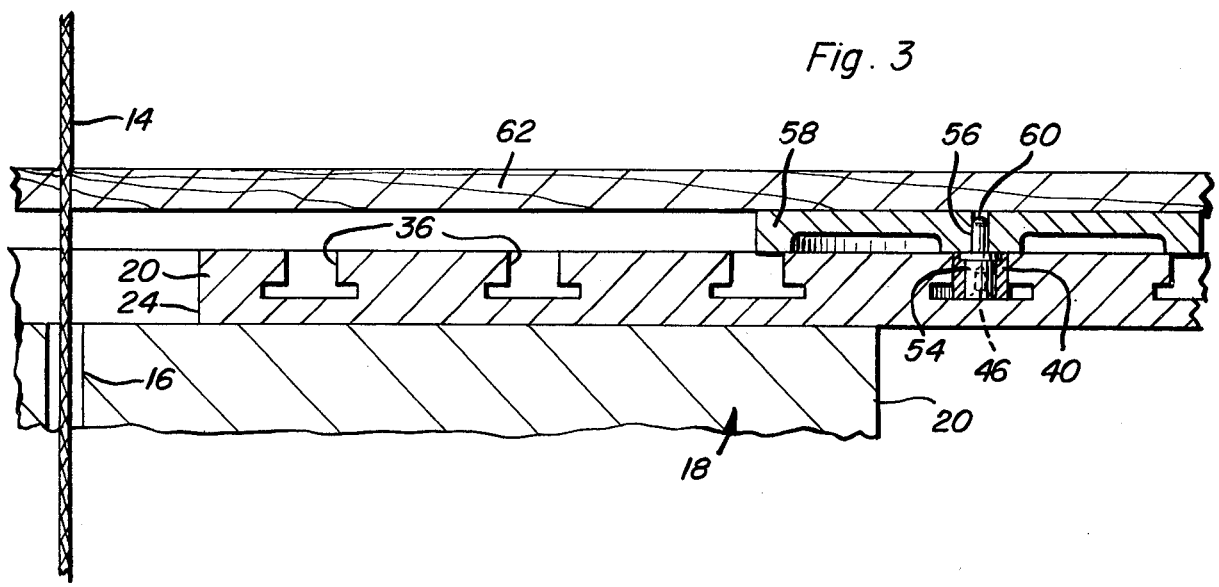
FIG. 3 is an enlarged fragmentary vertical sectional view taken substantially upon the plane indicated by the section line 3—3 of FIG. 1.
Figure 4:
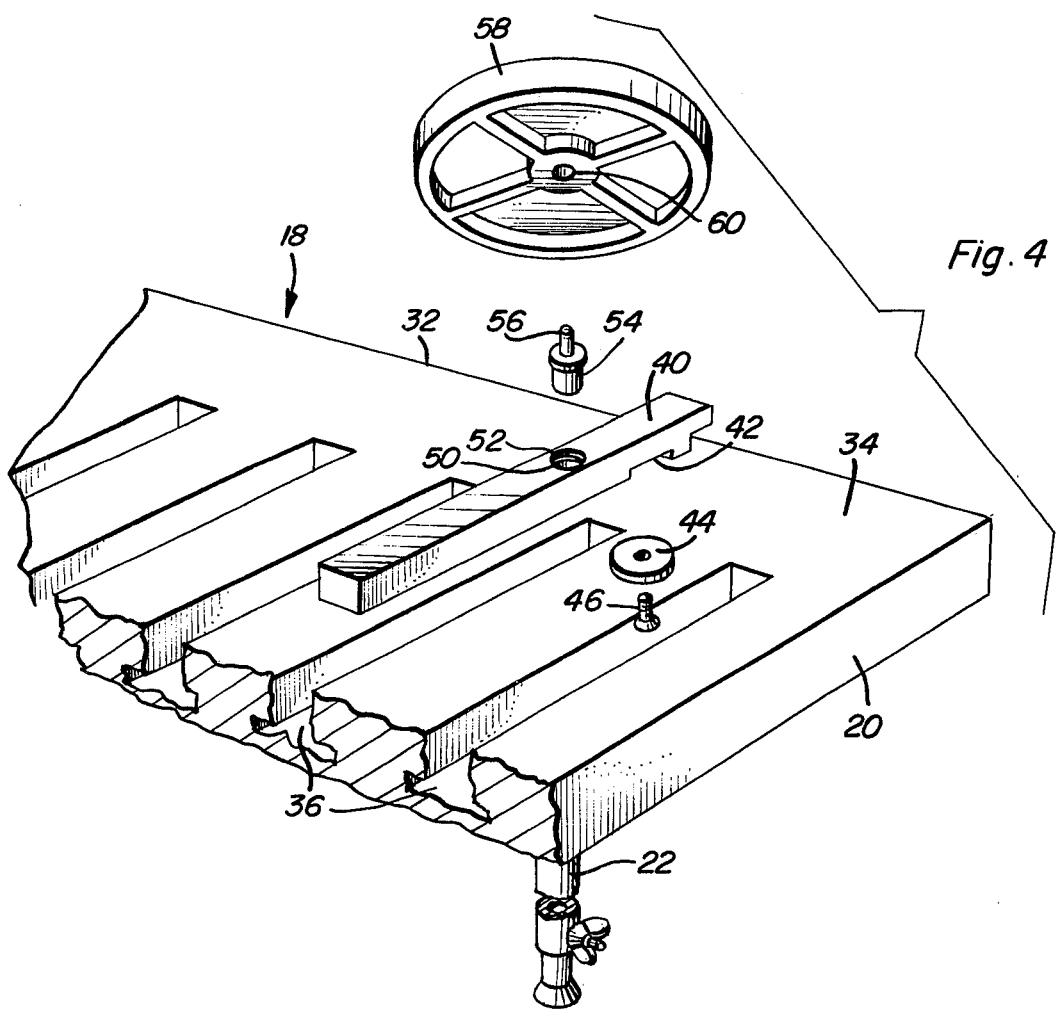
FIG. 4 is a fragmentary exploded perspective view of the circle cutting attachment of the instant invention.

The attachment 18 additionally includes an elongated bar-type follower 40 which may be endwise inserted into any one of the slots 36 and it may be seen from FIGS. 2 and 4 of the drawings that the first inserted end of the follower 40 includes a downwardly opening notch 42 in which a washer 44 is removably retained by means of a threaded fastener 46. When the follower 40 is engaged in one of the slots or grooves 36, the washer 44 keys the follower 40 in that groove against upward displacement therefrom. Also, the follower 40 includes a vertical bore 50 formed therethrough including an upper end counterbore 52 and a shouldered sleeve 54 is received in the bore 50 and seated in the couterbore 52. A pivot pin 56 is supported from the sleeve 54 and includes an upper end portion thereof which projects above the follower 40. A circular support disk or member 58 is provided with a central upstanding bore 60 and is journaled from the pivot pin 56 with the latter rotatably in the bore 60. Further, from FIGS. 1 and 2 of the drawings, it may be seen that when the follower 40 is disposed at the innermost end of one of the slots or grooves 36, the pivot pin 56 is substantially disposed in a plane normal to the grooves 36 and containing the inner end 26 of the notch 24.

If a circular cut is to be made in a workpiece, such as the workpiece 62, the base 20 is initially disposed on the table 12 and the leg assembly 22 is extended downwardly to support the corresponding end of the base 20 from the floor below the table 12. Thereafter, the base 20 is positioned on the table 12 so that the center indicia 28 is aligned with the saw blade 14 and the saw blade 14 is slightly spaced from the inner end 26 of the notch 24. Then, the follower 40 may be engaged with the open end of a selected groove 36 and the workpiece 62 may be positioned on the support disk or member 58. The slots or grooves 36 are spaced on 1 ½ inch centers and accordingly, inasmuch as each of the two sides of the notch 24 is 1 ½ inch wide, the pivot pin 56 may be positioned between 1 ½ inch and 25 ½ inches from the blade 14 in order that the attachment may be utilized in making a constant radius arcuate cut in a workpiece of any radius within that range, or may be used to cut a circular workpiece of a diameter between 3 and 51 inches.

After the workpiece 62 has been properly positioned upon the support disk or member 58, the saw 10 is placed in operation and the follower 40 is shifted inwardly from the open end of the associated slot or groove 36 to the innermost end thereof in order that the saw blade 14 may take the initial entrance cut 64 in the workpiece 62. After the follower 40 has abutted against the inner end of the associated slot or groove 36, the workpiece 62, supported from the rotatable support disk or member 58, may be angularly displaced about the pivot pin 56 in order that an arcuate cut of the desired radius may be made in the workpiece 62.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a cutting tool including a cutting element toward which a workpiece may be advanced along a predetermined path for cutting of said workpiece by said element, a base including a plurality of side by side parallel guides paralleling said path, a follower selectively removably engageable with any one of said guides for predetermined lateral adjustment of said follower relative to said path and guided movement of said follower along the selected guide in parallel relation relative to said path, a workpiece support rotatably supported from said follower for angular displacement about an axis substantially normal to a plane containing a pair of said guides, and support means supporting said base relative to said tool with said guides at least substantially paralleling said path.

2. The combination of claim 1 wherein said base guides and follower include coacting means limiting movement of said follower along said guides in one direction to positions in a plane normal to said guides and with said axis disposed in a second plane paralleling said axis and the first mentioned plane and in which said cutting element is disposed.

3. The combination of claim 1 wherein said tool comprises a saw, said support means comprising a generally horizontal saw table and said cutting element comprising an upstanding lengthwise movable elongated saw blade, said base being supported from said saw table.

4. The combination of claim 1 wherein said base comprises a horizontal panel member, said guides comprising upwardly opening parallel grooves formed in the upper surface of said panel member.

5. The combination of claim 4 wherein said grooves and said follower include coacting means for keying said follower in the associated groove against upward displacement therefrom.

6. The combination of claim 5 wherein said follower includes an upstanding pivot pin projecting upwardly above said upper surface of said panel member, said workpiece support being rotatably engaged with said pin.

7. The combination of claim 1 wherein said tool comprises a saw, said support means comprising a generally horizontal saw table and said cutting element comprising an upstanding lengthwise movable elongated saw blade, said base being supported from said table, said cutting element comprising a band saw blade.

* * * * *